US011444780B2

(12) United States Patent
Strong et al.

(10) Patent No.: US 11,444,780 B2
(45) Date of Patent: Sep. 13, 2022

(54) SECURE REPLACEABLE VERIFICATION KEY ARCHITECTURE IN A MEMORY SUB-SYSTEM

(71) Applicant: Micron Technology, Inc., Boise, ID (US)

(72) Inventors: Robert W. Strong, Folsom, CA (US); James Ruane, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 232 days.

(21) Appl. No.: 16/694,538

(22) Filed: Nov. 25, 2019

(65) Prior Publication Data

US 2020/0374130 A1 Nov. 26, 2020

Related U.S. Application Data

(60) Provisional application No. 62/850,990, filed on May 21, 2019.

(51) Int. Cl.
| | |
|---|---|
| *H04L 29/06* | (2006.01) |
| *H04L 9/32* | (2006.01) |
| *H04L 9/08* | (2006.01) |
| *H04L 9/00* | (2022.01) |

(52) U.S. Cl.
CPC ............ *H04L 9/3247* (2013.01); *H04L 9/006* (2013.01); *H04L 9/0894* (2013.01)

(58) Field of Classification Search
CPC ..... H04L 9/3247; H04L 9/0894; H04L 9/006; H04L 9/3268
See application file for complete search history.

(56) References Cited

U.S. PATENT DOCUMENTS

| 7,571,315 | B1* | 8/2009 | Smith | H04L 9/0894 |
| | | | | 713/158 |
| 8,813,117 | B1* | 8/2014 | Inskip, VI | H04N 7/1675 |
| | | | | 725/31 |
| 2005/0268092 | A1* | 12/2005 | Shankar | G06F 21/575 |
| | | | | 713/164 |
| 2014/0033188 | A1* | 1/2014 | Beavers | G06F 8/65 |
| | | | | 717/170 |
| 2014/0082065 | A1* | 3/2014 | Anakata | H04L 51/20 |
| | | | | 709/203 |
| 2015/0189509 | A1* | 7/2015 | Sheikh | H04W 24/04 |
| | | | | 726/4 |
| 2018/0082065 | A1* | 3/2018 | Liu | H04L 63/123 |
| 2018/0119975 | A1* | 5/2018 | Park | G06Q 10/063 |
| 2018/0137299 | A1* | 5/2018 | Porter | G06F 21/64 |

* cited by examiner

*Primary Examiner* — Joseph P Hirl
*Assistant Examiner* — Leynna Truvan
(74) *Attorney, Agent, or Firm* — Schwegman Lundberg & Woessner, P.A.

(57) ABSTRACT

A processing device receives, from a host system, a key manifest and a digital signature generated based on the key manifest using a private key corresponding to a public/private key pair. The key manifest comprises one or more verification keys. The digital signature is verified using the public key and the processing device stores the key manifest in a persistent storage component in response to successful verification of the digital signature. The one or more verification keys are utilized in one or more verification operations based on the key manifest being stored in the persistent memory component.

20 Claims, 7 Drawing Sheets

SECURE REPLACEABLE VERIFICATION KEY ARCHITECTURE IN A MEMORY SUB-SYSTEM

RELATED APPLICATIONS

This application claims the benefit of priority to U.S. Provisional Application Ser. No. 62/850,990, filed May 21, 2019, which is hereby incorporated by reference in its entirety.

TECHNICAL FIELD

Embodiments of the disclosure relate generally to memory sub-systems and, more specifically, to a secure replaceable verification key architecture in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
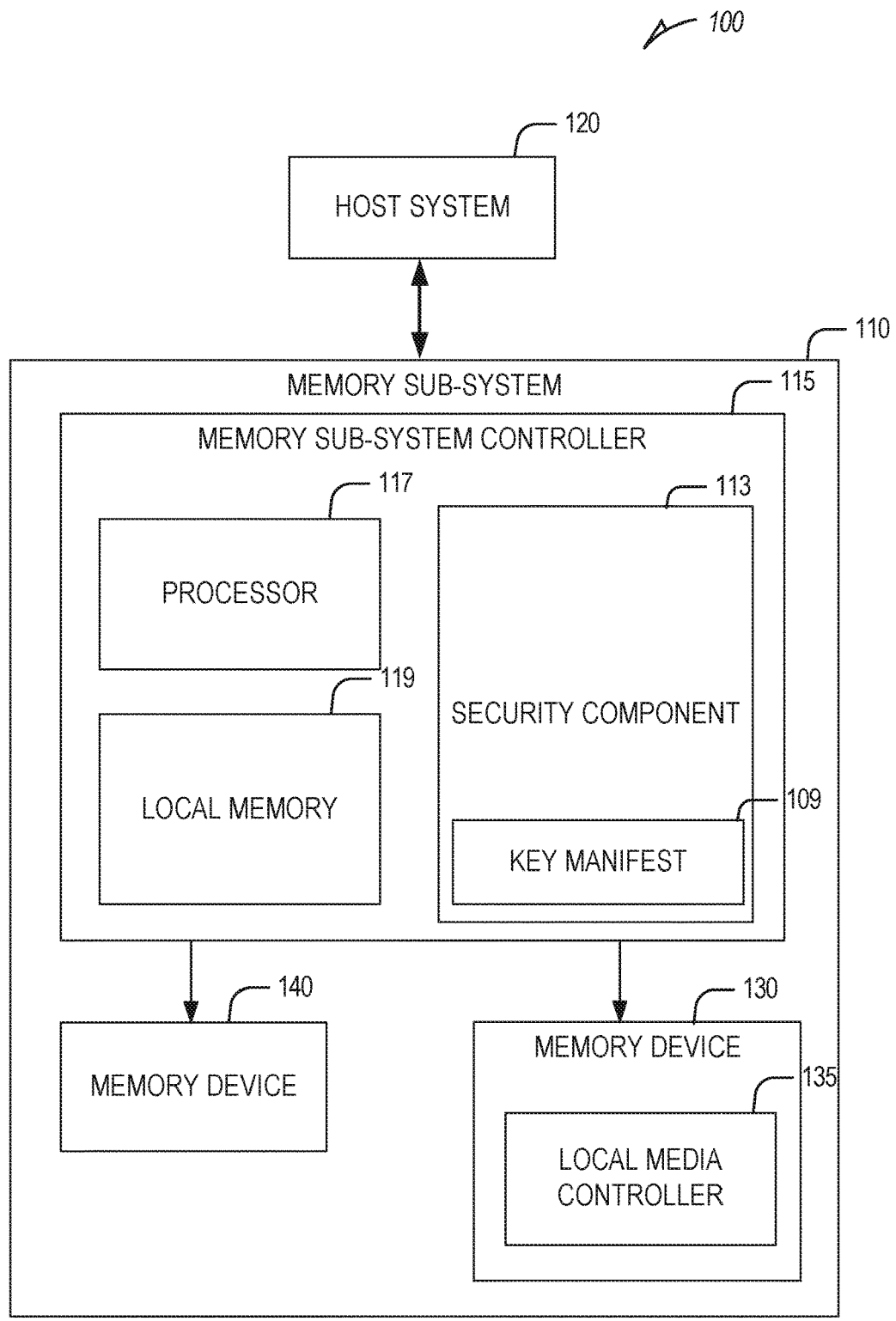
FIG. 1 illustrates an example computing environment that includes a memory sub-system, in accordance with some embodiments of the present disclosure.

Aspects of the present disclosure are directed to a secure replaceable verification key architecture in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

A memory sub-system may store confidential, proprietary, or other sensitive information that should only be accessed by specifically authorized users. To protect sensitive information stored by the memory sub-system, Public Key Infrastructure (PKI) is often used to cryptographically sign and verify sensitive information. In this manner, trust of origin and the capability to detect unauthorized modification can be derived. Example uses of PKI include firmware signing and verification as well as authorization of commands that may compromise security of a memory sub-system.

In certain implementations, a public key of a public/private key pair (also referred to herein as "cryptographic keys") is provisioned to a memory sub-system by an original equipment manufacturer (OEM) prior to shipment to customers while the private key is secured by a hardware security module (HSM) of a secure system (e.g., operated the OEM) that is external to and independent of the memory sub-system. Rivest-Shamir-Adleman (RSA) PKI operations allow for encryption and decryption operations. Data encrypted by the public key can only be decrypted by the corresponding private key. Further, data may be digitally signed using a private key and the corresponding public key may be used to verify the digital signature. A public key used to verify digital signatures is also referred to herein as a verification key. Examples of verification keys include: a production firmware verification key used to verify that production quality firmware has been signed with a production signing key; a development firmware verification key used to verify that development quality firmware has been signed with a development/engineering signing key; a manufacturing firmware verification key used to verify production quality firmware has been signed with a manufacturing firmware signing key; a deployed firmware verification key used to verify firmware has been signed with a deployed/production signing key; a F-Config verification key used to verify F-Config data has been signed with a F-Config signing key; and a device wrapping key used for PKI based device key wrapping (e.g., secure log support).

In some situations, it may be desired to change or replace one or more verification keys used by a memory sub-system. For example, a verification key may need to be replaced in the event that an associated private key is compromised (exposed) outside of an HSM. In these instances, the new verification key must be provided to the memory sub-system in a secure manner that preserves a web of trust to avoid creating security vulnerabilities that may be exploited to gain unauthorized access of sensitive information stored by the memory sub-system. Conventionally, a verification key provisioned to a memory sub-system by the OEM is hard-coded into firmware of the memory sub-system, and replacing the verification key requires replacing the old firmware with updated firmware that has the new verification key hardcoded. However, this cumbersome process can consume unnecessary time and computational resources.

Aspects of the present disclosure address the above and other issues by implementing a secure replaceable verification key architecture in a memory sub-system. The secure replaceable verification key architecture utilizes a key manifest comprising one or more verification keys. A valid key manifest is digitally signed using a private key corresponding to a verification key maintained by the memory subsystem. A host system may provide a new key manifest to the memory sub-system and a security component of a controller of the memory sub-system verifies the digital signature provided with the new key manifest using a public key. The public key may, for example, comprise a dedicated key manifest verification key used for verifying key manifest digital signatures. Based on successful verification of the digital signature, the controller stores the key manifest in a persistent storage component such as a non-volatile memory (NVM) component. For example, the key manifest may be stored in a negative-and (NAND) type memory component, a negative-or (NOR) memory component, a one-time programmable (OTP) circuit, an e-fuse, or another NVM type component.

The storing of the key manifest may include replacing one or more previous verification keys stored by the memory sub-systems. Once stored, the memory sub-system may utilize the one or more verification keys of the key manifest in one or more verification operations. Consistent with some embodiments, the security component may perform routine validation checks of the key manifest to detect tampering of the stored verification keys.

In some instances, a key manifest may be used to revoke rather than replace a verification key. For example, a controller of a memory sub-system may be provisioned with a set of dedicated key manifest verification keys used to verify key manifests. Each dedicated key manifest verification key is stored in an immutable storage component of the memory sub-system. A key manifest may be used to revoke one or more of the dedicated key manifest verification keys. In these instances, rather than including a new verification key in the key manifest, the key manifest specifies a key manifest verification key to revoke. The key manifest is digitally signed, and upon successful verification of the digital signature, the controller of the memory sub-system revokes the specified key manifest verification key.

The secure replaceable verification key architecture described herein reduces vulnerabilities in a memory sub-system by preventing access of sensitive information by unauthorized parties. Additionally, the secure replaceable verification key architecture allows verification keys to be replaced independently of firmware that may already be installed on the memory sub-system. For example, if a production firmware private key is exposed, a new public/private key pair can be generated, and the new public key can be uploaded to all memory sub-systems in the field without requiring additional firmware to be downloaded.

FIG. 1 illustrates an example computing environment 100 that includes a memory sub-system 110, in accordance with some embodiments of the present disclosure.

The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, USB interface, Fibre Channel, Serial Attached SCSI (SAS), and so forth. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a NAND type flash memory. Each of the memory devices 130 can include one or more arrays of memory cells such as single level cells (SLCs), multi-level cells (MLCs) (e.g., triple level cells (TLCs), or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

The memory sub-system 110 also includes a security component 113 that facilitates cryptographic operations (e.g., decryption, encryption, and digital signature verification). In some embodiments, the memory sub-system controller 115 includes at least a portion of the security component 113. For example, the memory sub-system controller 115 can include a processor 117 (processing device) configured to execute instructions stored in local memory 119 for performing the operations described herein. In some embodiments, the security component 113 is part of the host system 110, an application, or an operating system.

The security component 113 may further include a key manifest 109 to store one or more verification keys used by the security component 113 to verify information. For example, the key manifest 109 may store a public key used by the security component 113 to verify information signed using a corresponding private key. In some embodiments, the key manifest 109 is implemented within a local memory of the memory sub-system controller 115 (e.g., the local memory 119). In some embodiments, the key manifest 109 is implemented within one or more of the memory devices 130 and 140. The key manifest 109 may be implemented within an NVM component such that verification keys stored therein are not lost upon system reboot. For example, the key manifest may be stored in a NAND type memory component, a NOR memory component, an OTP circuit, an e-fuse, or another NVM type component.

The security component 113 may receive a new key manifest from the host system 120. The new key manifest is digitally signed using a private key corresponding to a public/private key pair. The public key of the private key pair is stored by the memory sub-system 110 and used to verify the digital signature provided with the new key manifest. The public key may be a dedicated verification key for verifying key manifest signatures and may accordingly be referred to as a key manifest verification key. A key manifest verification key is stored in an immutable storage component of the memory sub-system 110. For example, the key manifest verification key may be stored in a ROM component, an OTP circuit, an e-fuse, or other dedicated hardware component capable of storing a verification key.

In instances in which the new key manifest includes a new verification key, upon successful verification of the key manifest, the security component 113 stores the new key manifest in an NVM component and may replace one or more previous verification keys of the key manifest 109. Once stored, one or more verification keys may be used by the security component 113 to perform one or more verification operations. The security component 113 may perform routine validation checks on the new key manifest to ensure that the one or more verification keys have not been tampered with.

In instances in which the new key manifest specifies a key manifest verification key, the security component 113 may revoke the key manifest verification key as part of committing the new key manifest. To revoke the key manifest verification key, the security component 113 may update a key revocation map used to indicate which key manifest verification keys are valid.

The security component 113 may communicate with the host system 120 via the physical host interface or a native sideband communication port (e.g., a Universal Asynchronous Receiver/Transmitter (UART) port or other serial communication port that supports two-way communication) that may be specially configured as a diagnostic or maintenance port. Further details with regards to the operations of the security component 113 are described below.

Figure 2:
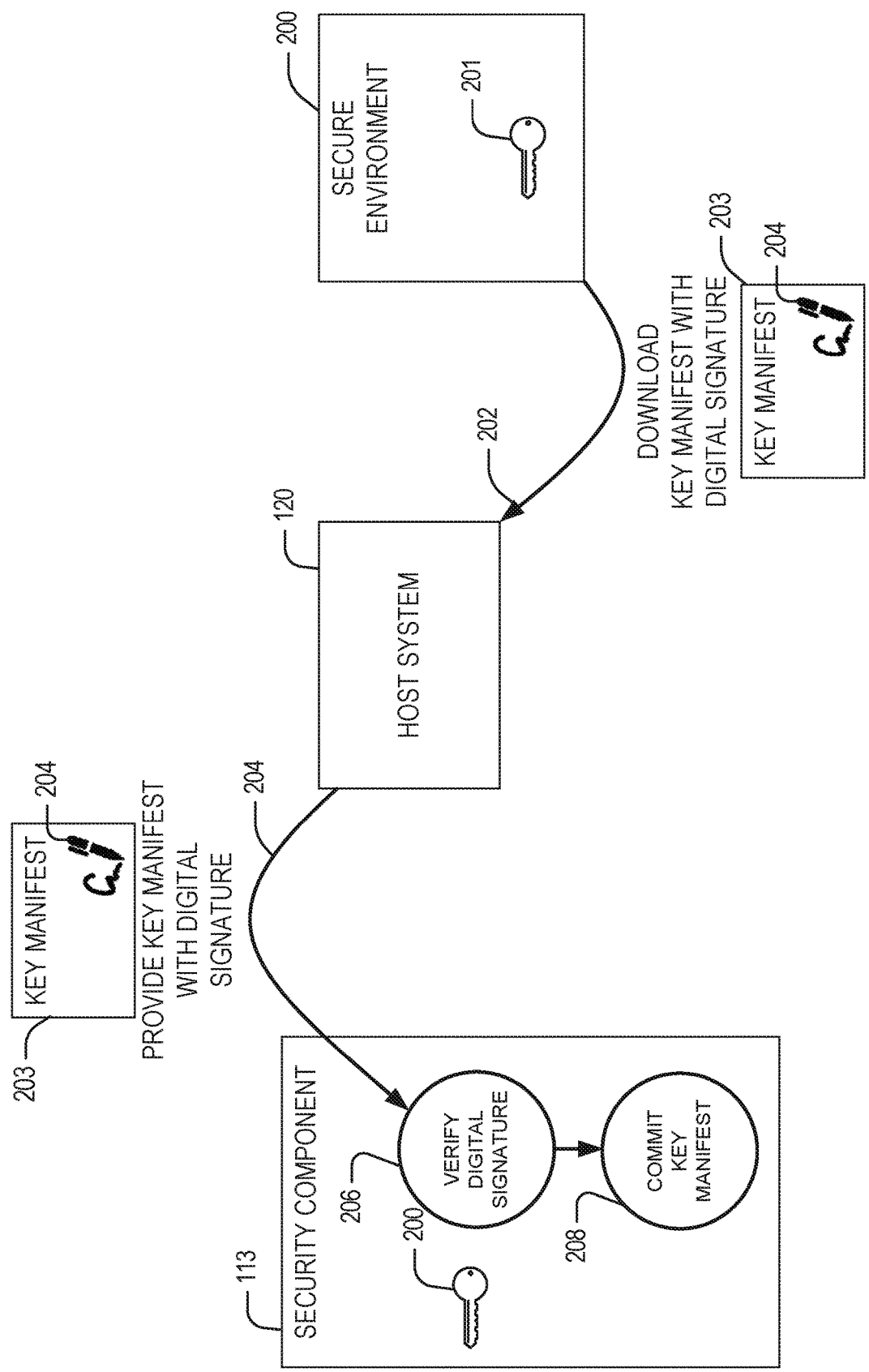
FIG. 2 is a data flow diagram illustrating interactions between components in a secure communication environment in performing an example method for loading a secure key manifest in a memory sub-system, in accordance with some embodiments of the present disclosure.

FIG. 2 is a data flow diagram illustrating interactions between components in a secure communication environment in performing an example method for loading a new key manifest at the memory sub-system 110, in accordance with some embodiments of the present disclosure. In the context of FIG. 2, a public/private key pair—a public key 200 and a private key 201—may be pre-generated, and the security component 113 may be provisioned with the public key 200, while a secure environment 202 (e.g., comprising one or more computer servers) is provisioned with the private key 201. The public key 200 is a key manifest verification key used by the security component 113 to validate new key manifests. The key manifest verification key may, for example, be implemented as an RSA public key (the actual key, e.g., 2048b or a digest of the key, e.g. SHA-256), an ECC public-key curve point or by some other digital signature algorithm component. The security component 113 stores the public key 200 in an immutable storage component (e.g., a ROM component, an OTP circuit, an e-fuse, or other dedicated hardware component capable of storing a verification key). The secure environment 202 may comprises an HSM to store the private key 201.

In the context of FIG. 2, a security event may give rise to a need for one or more verification keys to be replaced or revoked. To replace or revoke one or more verification keys, a new key manifest 203 is generated by the secure environment 202 along with a digital signature 204 generated using the private key 201. In instances in which a verification key is to be replaced, the key manifest 203 comprises at least one verification key to be used by the security component 113 in performing one or more verification operations. As an example, the key manifest 203 may include any one or more of a production firmware verification key, a development firmware verification key, a manufacturing verification key, or a transaction verification key. In instances in which the key manifest 203 is to be used to revoke a key manifest verification key, the key manifest 203 specifies the key to be revoked. The key manifest 203 may further comprise or specify any one or more of: a manifest version, a security version, a product identifier, a product variant, a size of the manifest, a number of keys included in the manifest, a key identifier, a key usage, and a key size. Further details regarding the structure of a key manifest are described below in reference to FIG. 3.

As shown, at 202, the host system 120 downloads the new key manifest 203 from the secure environment along with the digital signature 204 generated based on the new key manifest using the private key 201. In turn, the host system 120 (or a user thereof) provides the new key manifest 203 along with the digital signature 204 to the memory sub-system 110.

At 206, the security component 113 of the memory sub-system 110 performs a verification of the digital signature 204 using the public key 200. The security component 113 discards the key manifest 203 if the key manifest was signed using a revoked key, if the key manifest was signed with an invalid key or if the key manifest security version is invalid. Likewise, if the verification is not successful, the security component 113 discards the key manifest 203.

Based on a successful verification of the digital signature, the memory sub-system 110 commits the new key manifest, for example, by storing the new key manifest in an NVM memory component, at 208. In storing the new key manifest, the memory sub-system 110 may replace one or more previous verification keys.

If the key manifest specifies a key manifest verification key to be revoked (not shown in FIG. 2), the security component 113 may commit the key manifest by revoking a previous key manifest verification key. The security component 113 may implement a revocation map to track which key manifest verification keys are valid and which have been revoked.

The act of revoking a key manifest verification key is different than the act of replacing other types of verification keys. For verifications keys that are not key manifest verification keys, the security component 113 uses a key manifest to facilitate replacement. These types of verification keys are replaceable because they are not immutable (e.g., stored in NVM). For key manifest verification keys, a key manifest is used to revoke one or more key manifest verification keys. The keys are non-replaceable because they reside in immutable storage.

Figure 3:
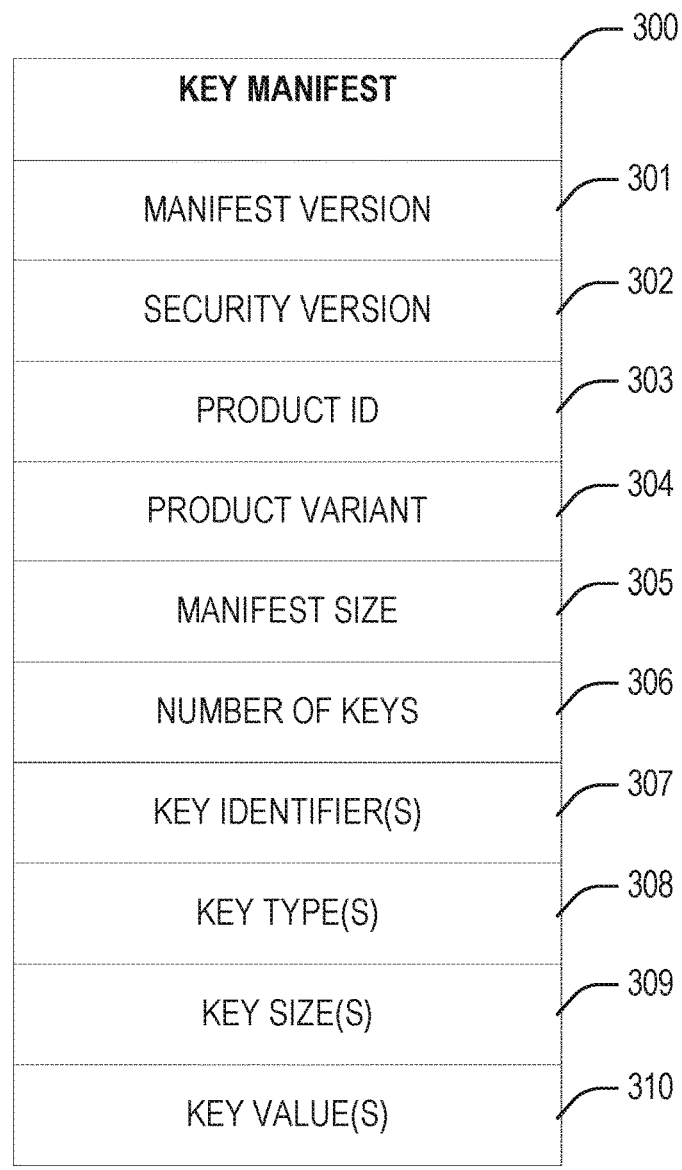
FIG. 3 is a schematic diagram illustrating a structure of a key manifest, according to example embodiments.

FIG. 3 is a schematic diagram illustrating a structure of a key manifest 300, according to example embodiments. The key manifest 300 may be stored, in part or in whole, in a persistent storage component. For example, the key manifest 300 may be stored in an NVM component of the memory sub-system 110 such as a NAND component, a NOR component, an OTP circuit, an e-fuse, or other dedicated hardware component capable of storing a verification key. The controller 115 or firmware executed by the controller 115 may provide a "fingerprint" in the form of either a machine authentication code (MAC) or digital signature, which can be used to detect tampering of the stored keys. The firmware executed by the controller 115 and the key manifest 300 may have their own unique fingerprints, or the firmware and the key manifest 300 may share a common fingerprint.

As shown, the key manifest 300 includes any one or more of the following components: a manifest version 301, a security version 302, a product identifier (ID) 303, a product variant 304, a size of the manifest 305, a number of keys 306 described, key identifier(s) 307, key type(s) 308, key size(s) 309, and key value(s) 310.

The security version 302 may be used to ensure that older, yet validly signed, key manifests cannot be uploaded to the memory sub-system 110. For example, if the manifest security version 302 of the manifest 300 is greater than or equal to a security version of the manifest currently resident on the memory sub-system 110, then the key manifest 300 may be accepted assuming all other verifications are successful. If the manifest security version of the manifest 300 is less than the security version of the manifest currently resident on the memory sub-system 110, then the key manifest 300 may be rejected.

The security version 302 comprises a major value and a minor value. The major value is used to indicate that a security event occurred that required the replacement or revocation of one or more keys. The major value may be product specific. When a downloaded key manifest specifies a major value that is greater than the major value of the provisioned key manifest, then the new major value may be saved in an immutable location (e.g., eFuse/OTP). The minor value indicates that one or more keys are being replaced (not revoked) due to a non-security event.

The product ID 303 specifies a product that the manifest 300 is targeting. The product ID 303 may be used to ensure that key manifests intended for a specific product based on a common controller cannot be used by another product using the same controller.

The product variant 304 specifies, for a given product ID, information that can be further used by the security component 113 to verify that the manifest 300 is valid for a product. For example, Customer 'A' has a requirement that only firmware developed for Customer A's device can be installed on Customer A's device. In this example, the product variant 304 could be used to specify that the key manifest 300 is only valid for a particular product and customer.

The key identifier(s) 307, key type(s) 308, key size(s) 309, and key value(s) 310 are collectively referred to as "key descriptors." For a given key, key identifier 307 specifies which key is to be replaced or revoked, key type 308 specifies how the key is used, key size 309 specifies a size of the key, and key value 310 specifies the actual value of the key.

Figure 4:
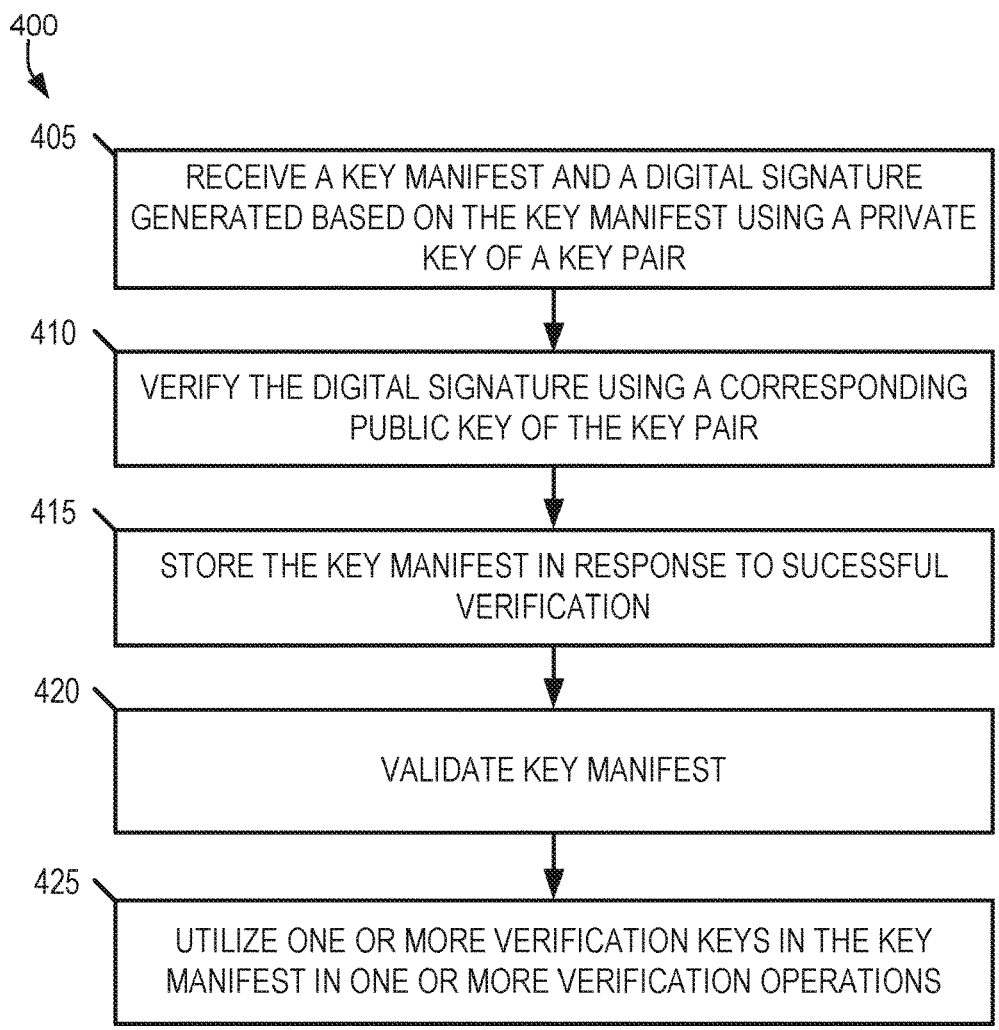
FIGS. 4 and 5 are flow diagrams illustrating an example method for replacing a verification key using a key manifest in a memory sub-system, in accordance with some embodiments of the present disclosure.
Figure 5:
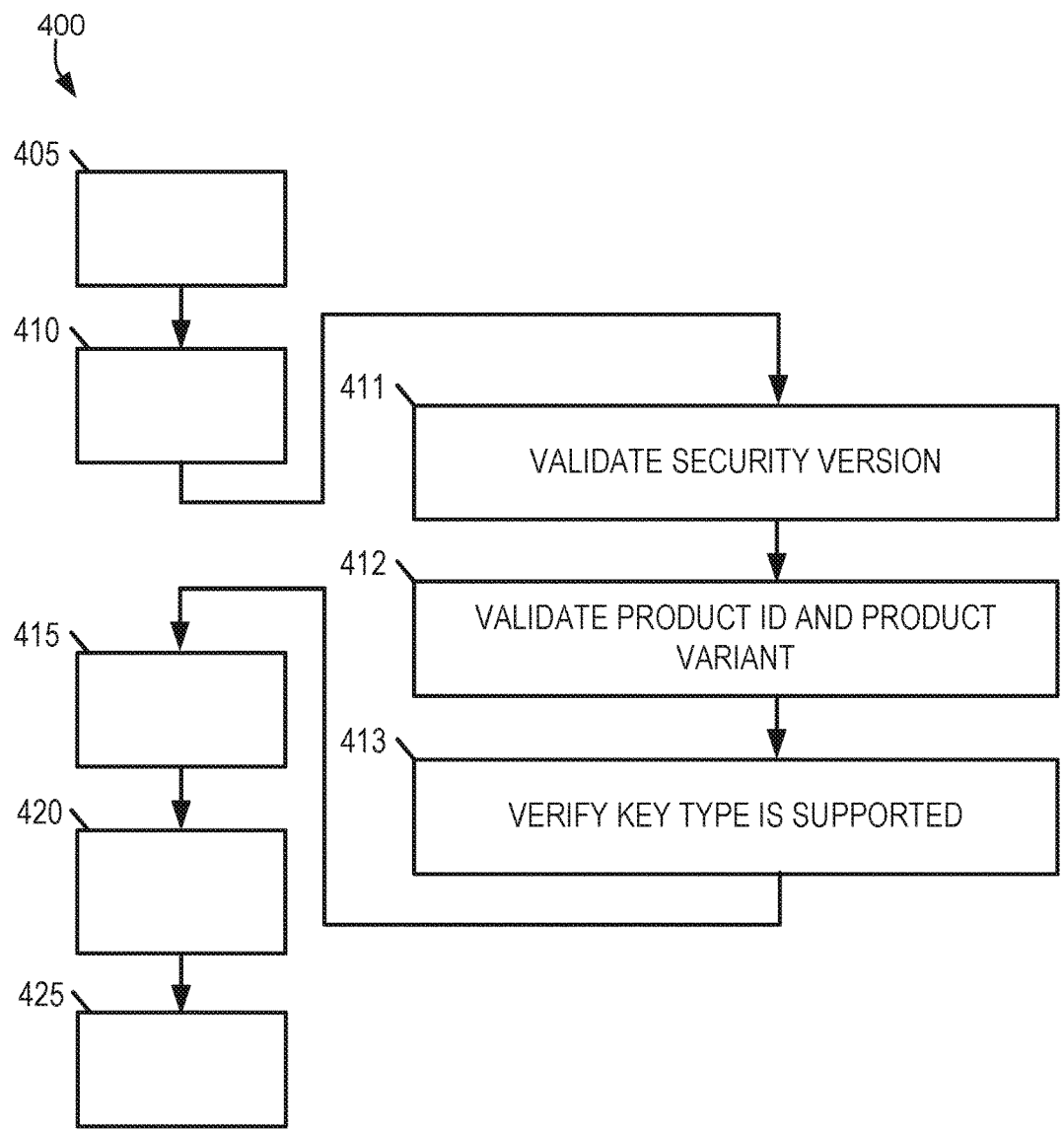

FIGS. 4 and 5 are flow diagrams illustrating an example method 400 for replacing a verification key using a key manifest in a memory sub-system, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the security component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives a key manifest and a digital signature generated based on the key manifest using a private key. The key manifest comprises one or more verification keys. The private key corresponds to a public/private key pair, and the public key of the pair may be maintained by the processing device or provided with the key manifest. The digital signature may be generated at a secure environment (e.g., the secure environment 202) using a digital signature algorithm (e.g., RSASSA, ECC, or the like). For example, the digital signature may be generated by generating a first hash based on the key manifest using a hashing algorithm and encrypting the first hash using the private key.

The key manifest and digital signature may be received from the host system 120. In some embodiments, receiving the key manifest includes receiving one or more commands from the host system via a host system interface.

The processing device, at operation 410, verifies the digital signature using the corresponding public key. That is, the processing device determines whether the digital signature is valid. As noted above, the public key may be a dedicated key manifest verification key stored in an immutable storage component. The processing device verifies the digital signature in accordance with the digital signature algorithm used to create the digital signature (e.g., RSASSA, ECC, or the like). For example, the processing device may verify the digital signature by decrypting the digital signature using the public key to produce a first hash and generating a second hash based on the key manifest using the hashing algorithm used to generate the first hash. If the first and second hash match, the digital signature is valid. Otherwise, the digital signature is invalid, and the processing device may discard the key manifest, create an entry in an error log, and return an error to the host system.

At operation 415, the processing device stores the key manifest in a persistent storage component in response to successful verification of the digital signature. For example, the processing device may store the key manifest in an NVM component. In storing the key manifest, the processing device may protect the key manifest using a unique digital fingerprint such as a MAC or digital signature. In this way, the processing device may protect the system from using a key manifest that has been altered or otherwise tampered with.

The storing of the key manifest may include replacing one or more verification keys. That is, the processing device may store one or more verification keys from the key manifest in the persistent storage component and discard the one or more previously stored verification keys.

Prior to using the one or more verification keys in verification operations, the processing device validates the key manifest (at operation 420). The processing device may validate the key manifest to ensure that the one or more verification keys have not be altered or otherwise tampered with. The validating of the key manifest may, in some embodiments, include validating the unique fingerprint associated with the key manifest. The unique fingerprint may comprise either a MAC (e.g., a hash-based MAC (HMAC) or a cipher-based MAC (CMAC)) or a digital signature.

The processing device may perform validation checks on the key manifest routinely. For example, the processing device may perform a validity check according to a just-in-time approach where a validity check is performed prior to each time a verification key is used in a verification operation. As another example, the processing device may perform a validity check at system start up.

At operation 425, the processing device utilizes the one or more verification keys included in the stored key manifest in one or more verification operations. For example, the processing key may use a verification key included in the stored key manifest to verify a firmware's digital signature.

As shown in FIG. 5, the method 400 may, in some embodiments, include operations 411, 412, and 413. Consistent with these embodiments, the operations 411, 412, and 413 may be performed prior to operation 415 where the security component 113 stores the key manifest in an NVM component. In some embodiments, the operation 415 is performed based on operations 410, 411, 412, and 413.

As noted above, a key manifest may comprise or otherwise specify a security version (e.g., security version 302), a product ID (e.g., product ID 303), a product variant (e.g., product variant 304), and a key type 308. At operation 411, the processing device validates a security version of the key manifest. For example, the processing device may validate a major value and a minor value of the security version. The major value indicates that the replacement or revocation of one or more keys is due to a security event. If the processing device determines the major value is greater than the major value of a current key manifest, then the processing device saves the new major value in an immutable component (e.g., eFuse/OTP). The minor value indicates that one or more keys are being replaced (not revoked) due to a non-security event.

The processing device, at operation 412, validates the product ID and product variant of the key manifest. The product ID specifies a product that the key manifest is targeting, and the product variant specifies, for a given product ID, information that can be further used by the processing device to verify the particular product that the key manifest is targeting. Accordingly, the processing device validates the product ID by confirming that the processing device corresponds to the specific product corresponding to the product ID and product variant. The processing device also verifies that the key type is supported by the processing device at operation 413.

If the processing device determines that any one of the security version, product variant, or product ID is invalid, the processing device discards the key manifest, logs an event in a security log, and responds to the host system with an error.

Figure 6:
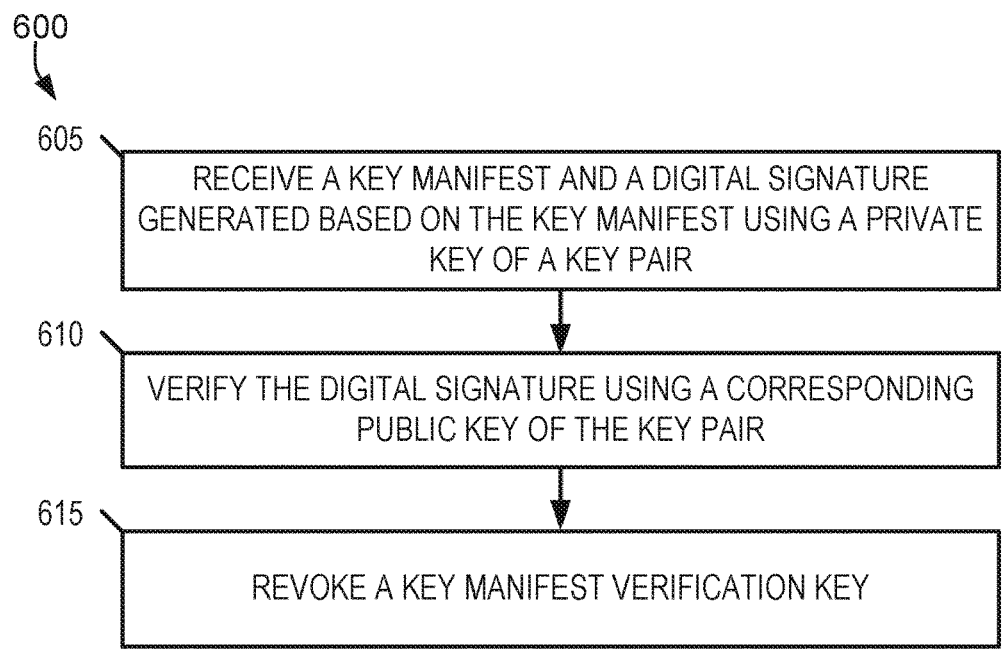
FIG. 6 is a flow diagrams illustrating an example method for revoking a key manifest verification key using a key manifest in a memory sub-system, in accordance with some embodiments of the present disclosure.
Figure 7:
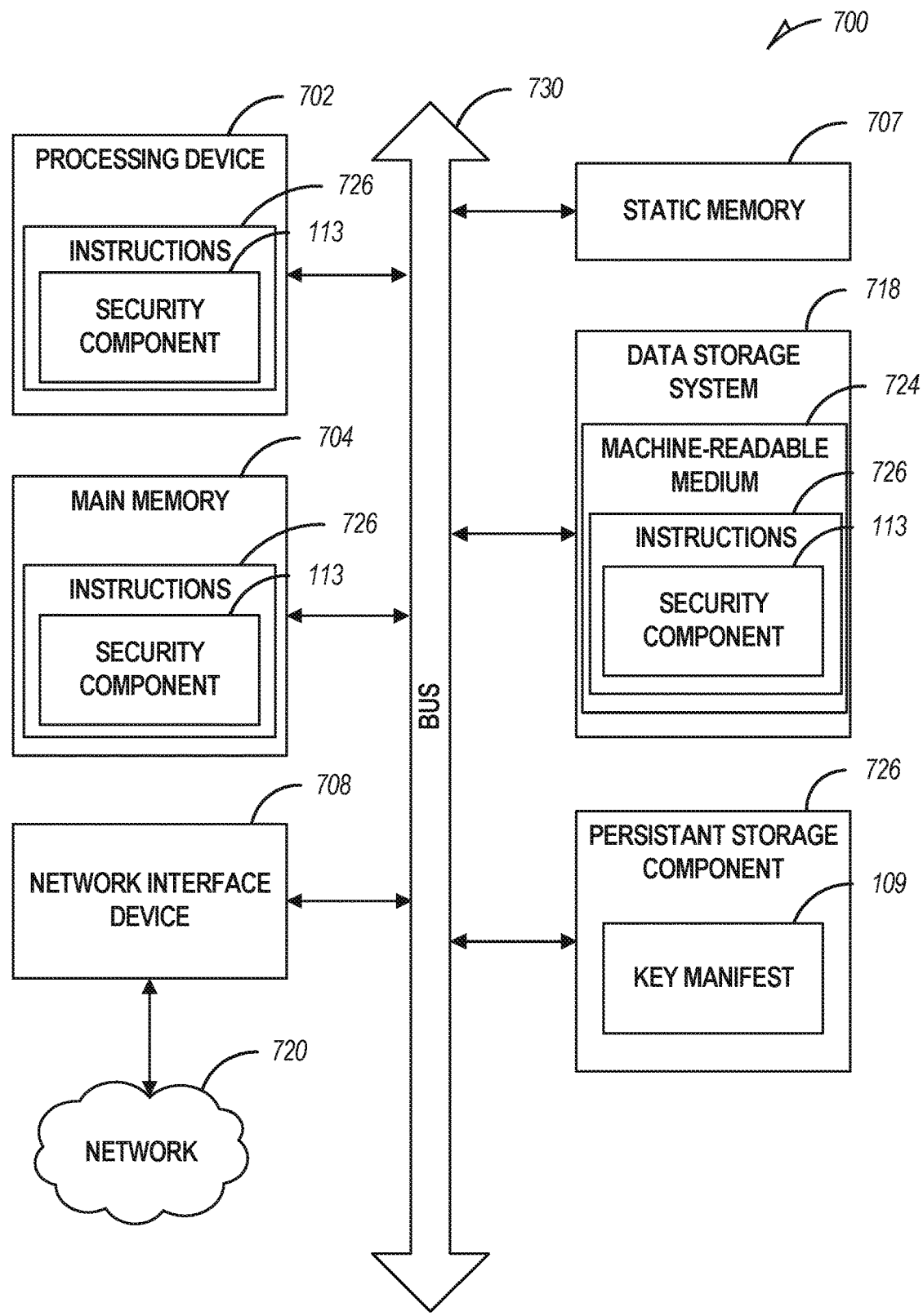
FIG. 7 is a block diagram of an example computer system in which embodiments of the present disclosure may operate.

FIG. 6 is a flow diagrams illustrating an example method 600 for revoking a verification key using a key manifest in a memory sub-system, in accordance with some embodiments of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the security component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device receives a key manifest and a digital signature generated based on the key manifest using a private key. The key manifest specifies a key manifest verification key to be revoked. Accordingly, the key manifest may comprise an identifier of the key manifest verification key. The key manifest verification key may be one of a set of key manifest verification keys provisioned to a memory sub-system. The set of key manifest verification keys may be stored in an immutable storage component.

The private key corresponds to a public/private key pair, and the public key of the pair may be maintained by the processing device or provided with the key manifest. The public key may be a dedicated key manifest verification key stored in an immutable storage component. For example, the public key may be a first key manifest verification key of a set of key manifest verification key provisioned to the memory sub-system and the manifest verification key to be revoked is a second key manifest verification key in the set. The digital signature may be generated at a secure environment (e.g., the secure environment 202) using a digital signature algorithm (e.g., RSASSA, ECC, or the like). For example, the digital signature may be generated by generating a first hash based on the key manifest using a hashing algorithm and encrypting the first hash using the private key.

The key manifest and digital signature may be received from the host system 120. In some embodiments, receiving the key manifest includes receiving one or more commands from the host system via a host system interface.

The processing device, at operation 610, verifies the digital signature using the corresponding public key. That is, the processing device determines whether the digital signature is valid. The processing device verifies the digital signature in accordance with the digital signature algorithm used to create the digital signature (e.g., RSASSA. ECC, or the like). For example, the processing device may verify the digital signature by decrypting the digital signature using the public key to produce a first hash and generating a second hash based on the key manifest using the hashing algorithm used to generate the first hash. If the first and second hash match, the digital signature is valid. Otherwise, the digital signature is invalid and the processing device may discard the key manifest, create an entry in an error log, and return an error to the host system.

At operation 615, the processing device revokes the key manifest verification key specified in the key manifest. That is, the processing device revoke a key manifest verification key that was previously provisioned to the memory sub-system. In revoking the previously provisioned key manifest verification key, the processing device may update a revocation map used to track revoked key manifest verification keys. Specifically, to effectuate the revocation, the processing device may update the revocation map to indicate that the previously provisioned key manifest verification key has been revoked. For example, the revocation map may comprise a set of flags, where each flag corresponds to a key manifest verification key provisioned to the processing device. If none of the flags in the revocation map are set, all key manifest verification keys are valid. When a key manifest verification key is revoked, the corresponding flag within the revocation map is set to indicate that the key manifest verification key has been revoked. The processing device may consult the revocation map to determine whether a particular key manifest verification key is valid prior to using the key manifest verification key.

EXAMPLES

Example 1 is a system comprising: a memory component to store a public key of a public/private key pair; and a memory sub-system controller, operatively coupled with the at least one memory component, to perform operations comprising: receiving, from a host system, a key manifest and a digital signature, the digital signature being generated based on the key manifest using a private key corresponding to the public/private key pair, the key manifest comprising one or more verification keys; verifying the digital signature using a public key of the public/private key pair; storing the key manifest in a persistent storage component in response to successful verification of the digital signature; and utilizing the one or more verification keys in one or more verification operations based on the key manifest being stored in the persistent memory component.

In Example 2, the subject matter of Example 1 optionally comprises replacing one or more previously stored verification keys with the one or more verification keys.

In Example 3, the subject matter of any one or more of Examples 1 or 2 optionally comprises an immutable storage component, and the public key optionally corresponds to a key manifest verification key.

In Example 4, the subject matter of any one or more of Examples 1-3 optionally comprises an immutable storage component, and the immutable storage component comprises one of a read only memory (ROM) component, a one-time programmable (OTP) circuit, an e-fuse, or a dedicated hardware component.

In Example 5, the subject matter of any one or more of Examples 1-4 optionally comprises validating the key manifest prior to utilizing the one or more verification keys in a verification operation.

In Example 6, the subject matter of any one or more of Examples 1-5 optionally comprises validating a digital fingerprint associated with the key manifest.

In Example 7, the key manifest in any one or more of Examples 1-6 optionally comprises one or more of a security version, a product identifier, a product variant, and a key type.

In Example 8, the subject matter of any one of Examples 1-7 optionally comprises validating a security version of the key manifest; validating a product identifier and a product variant of the key manifest; and validating a key type of the one or more verification keys included in the key manifest.

In Example 9, the subject matter of any one of Examples 1-8 optionally comprises validating a security version of the key manifest by comparing the security version of the key manifest to a current security version associated with a previously stored key manifest.

In Example 10, the persistent storage component of any one of Examples 1-9 optionally comprises one of: a negative-and (NAND) type memory component, a negative-or (NOR) memory component, a one-time programmable (OTP) circuit, or an e-fuse.

Example 11 is a method comprising: receiving, at a memory sub-system controller comprising one or more hardware processors, from a host system, a key manifest and a digital signature, the digital signature being generated based on the key manifest using a private key corresponding to a key pair, the key pair comprising the private key and a public key stored in an immutable storage component of the memory sub-system controller, the key manifest comprising one or more verification keys; verifying the digital signature using a public key of the public/private key pair; storing the key manifest in a persistent storage component in response to successful verification of the digital signature; and utilizing the one or more verification keys in one or more verification operations based on the key manifest being stored in the persistent memory component.

In Example 12, the subject matter of Example 11 optionally comprises replacing one or more previously stored verification keys with the one or more verification keys.

In Example 13, the subject matter of any one or more of Examples 11 or 12 optionally comprises validating a digital fingerprint associated with the key manifest prior to utilizing the one or more verification keys in the one or more verification operations.

In Example 14, the subject matter of any one or more of Examples 11-13 optionally comprises comparing a security version of the key manifest to a current security version associated with a previously stored key manifest.

In Example 15, the persistent storage component of any one or more of Examples 11-14 optionally comprises one of: a negative-and (NAND) type memory component, a negative-or (NOR) memory component, a one-time programmable (OTP) circuit, or an e-fuse.

In Example 16, the key manifest in any one or more of Examples 11-15 optionally comprises one or more of a security version, a product identifier, a product variant, and a key type.

In Example 17, the subject matter of any one of Examples 11-16 optionally comprises validating a security version of the key manifest; validating a product identifier and a product variant of the key manifest; and validating a key type of the one or more verification keys included in the key manifest.

Example 18 is a system comprising: a memory component to store a set of key manifest verification keys; and a memory sub-system controller, operatively coupled with the at least one memory component, to perform operations comprising: receiving, from a host system, a key manifest and a digital signature, the digital signature being generated based on the key manifest using a private key corresponding to a public/private key pair, the key manifest specifying a first key manifest verification key to be revoked; verifying the digital signature using a public key of the public/private key pair; and revoking the first key manifest verification key based on successful verification of the digital signature.

In Example 19, the subject matter of Example 18 optionally comprises updating a revocation map to indicate that the first key manifest verification key has been revoked.

In Example 20, the at least one memory component of any one of Examples 18 or 19 optionally comprises at least one of a read only memory (ROM) component, a one-time programmable (OTP) circuit, an e-fuse, or a dedicated hardware component and the public key optionally comprises a second key manifest verification key from the set of key manifest verification keys.

FIG. 6 illustrates an example machine in the form of a computer system 600 within which a set of instructions can be executed for causing the machine to perform any one or more of the methodologies discussed herein. FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the security component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a security component (e.g., the security component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM. RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
at least one memory component to store a public key of a public/private key pair; and
a processing device, operatively coupled with the at least one memory component, to perform operations comprising:
receiving, from a host system, a key manifest and a digital signature, the digital signature being generated based on the key manifest using a private key corresponding to the public/private key pair, the key manifest comprising one or more verification keys and a security version, the security version comprising a major value and a minor value, the major value indicating whether one or more keys are being replaced or revoked due to a security event, the minor value indicating whether one or more keys are being replaced due to a non-security event;
verifying the digital signature using a public key of the public/private key pair;
validating the security version of the key manifest based on a comparison of the security version to a current security version associated with a previously stored key manifest, the validating of the security version of the key manifest comprises determining the major value of the security version is greater than or equal to a major value of the current security version associated with the previously stored key manifest;
storing the key manifest in a persistent storage component in response to successful verification of the digital signature and validation of the security version of the key manifest; and
utilizing the one or more verification keys in one or more verification operations based on the key manifest being stored in the persistent memory component.

2. The memory sub-system of claim 1, wherein the storing of the key manifest in the persistent storage component comprises replacing one or more previously stored verification keys with the one or more verification keys.

3. The memory sub-system of claim 1, wherein:
the memory component comprises an immutable storage component;
the public key corresponds to a key manifest verification key.

4. The memory sub-system of claim 3, wherein the immutable storage component comprises one of a read only memory (ROM) component, a one-time programmable (OTP) circuit, an e-fuse, or a dedicated hardware component.

5. The memory sub-system of claim 1, wherein the operations further comprise validating the key manifest prior to utilizing the one or more verification keys in a verification operation.

6. The memory sub-system of claim 5, wherein the validating of the key manifest comprises validating a digital fingerprint associated with the key manifest.

7. The memory sub-system of claim 1, wherein the key manifest further comprises one or more of manifest version a product identifier, a product variant, and a key type.

8. The memory sub-system of claim 7, wherein the operations further comprise:
validating the product identifier and the product variant of the key manifest; and
validating the key type of the one or more verification keys included in the key manifest.

9. The memory sub-system of claim 1, wherein the persistent memory component comprises one of: a negative-and (NAND) type memory component, a negative-or (NOR) memory component, a one-time programmable (OTP) circuit, or an e-fuse.

10. A method comprising:
receiving, at processing device of a memory sub-system, from a host system, a key manifest and a digital signature, the digital signature being generated based on the key manifest using a private key corresponding to a key pair, the key pair comprising the private key and a public key stored in an immutable storage component of the processing device, the key manifest comprising one or more verification keys and a security version, the security version comprising a major value and a minor value, the major value indicating whether one or more keys are being replaced or revoked due to a security event, the minor value indicating whether one or more keys are being replaced due to a non-security event;
verifying the digital signature using a public key of the key pair;
validating the security version of the key manifest based on a comparison of the security version to a current security version associated with a previously stored key manifest, the validating of the security version of the key manifest comprises determining the major value of the security version is greater than or equal to a major value of the current security version associated with the previously stored key manifest;
storing the key manifest in a persistent storage component in response to successful verification of the digital signature and validation of the security version of the key manifest; and
utilizing the one or more verification keys in one or more verification operations based on the key manifest being stored in the persistent memory component.

11. The method of claim 10, wherein the storing of the key manifest in the persistent storage component comprises replacing one or more previously stored verification keys with the one or more verification keys.

12. The method of claim 10, further comprising validating a digital fingerprint associated with the key manifest prior to utilizing the one or more verification keys in the one or more verification operations.

13. The method of claim 10, wherein the persistent memory component comprises one of: a negative-and (NAND) type memory component, a negative-or (NOR) memory component, a one-time programmable (OTP) circuit, or an e-fuse.

14. The method of claim 10, wherein the key manifest further comprises one or more of: a manifest version, a product identifier, a product variant, and a key type.

15. The method of claim 14, wherein the operations further comprise:
validating the product identifier and the product variant of the key manifest; and
validating the key type of the one or more verification keys included in the key manifest.

16. The method of claim 10, wherein the persistent memory component comprises one of: a negative-and (NAND) type memory component, a negative-or (NOR) memory component, a one-time programmable (OTP) circuit, or an e-fuse.

17. A memory sub-system comprising:
at least one memory component to store a set of key manifest verification keys; and
a processing device, operatively coupled with the at least one memory component, to perform operations comprising:
receiving, from a host system, a key manifest and a digital signature, the digital signature being generated based on the key manifest using a private key corresponding to a public/private key pair, the key manifest including a security version and specifying a first key manifest verification key from the set of key manifest verification keys to be revoked, the security version comprising a major value and a minor value, the major value indicating whether one or more keys are being replaced or revoked due to a security event, the minor value indicating whether one or more keys are being replaced due to a non-security event;
verifying the digital signature using a public key of the public/private key pair;
validating the security version of the key manifest based on a comparison of the security version to a current security version associated with a previously stored key manifest, the validating of the security version of the key manifest comprises determining the major value of the security version is greater than or equal to a major value of the current security version associated with the previously stored key manifest; and
based on successful verification of the digital signature and validation of the security version, revoking the first key manifest verification key.

18. The memory sub-system of claim 17, wherein the revoking of the first key manifest verification key comprises updating a revocation map to indicate that the first key manifest verification key has been revoked.

19. The memory sub-system of claim 17, wherein:
the at least one memory component comprises at least one of a read only memory (ROM) component, a one-time programmable (OTP) circuit, an e-fuse, or a dedicated hardware component; and the public key comprises a second key manifest verification key from the set of key manifest verification keys.

20. The memory sub-system of claim 17, wherein the key manifest further comprises one or more of: a manifest version, a product identifier, a product variant, and a key type.

\* \* \* \* \*